United States Patent
Ramanathan

[11] 3,869,498
[45] Mar. 4, 1975

[54] WATER-INSOLUBLE STYRYL DYESTUFFS

[75] Inventor: Visvanathan Ramanathan, Basel, Switzerland

[73] Assignee: Ciba-Geigy AG, Basel, Switzerland

[22] Filed: Jan. 3, 1968

[21] Appl. No.: 695,346

Related U.S. Application Data

[63] Continuation-in-part of Ser. No. 436,666, March 2, 1965, abandoned.

[30] Foreign Application Priority Data
Mar. 9, 1964 Switzerland.......................... 2993/64
Feb. 11, 1965 Switzerland.......................... 1886/65

[52] U.S. Cl........ 260/465 D, 260/294.9, 260/330.5, 260/347.4
[51] Int. Cl.................. C07c 121/60, C07c 121/70
[58] Field of Search..................... 260/465 D, 465 E

[56] References Cited
UNITED STATES PATENTS

| | | | |
|---|---|---|---|
| 2,206,108 | 7/1940 | Muller et al. | 260/465 D |
| 2,226,054 | 12/1940 | Felix et al. | 260/465 D |
| 2,583,551 | 1/1952 | Dickey et al. | 260/465 D |
| 2,583,551 | 1/1952 | Dickey et al. | 260/465 |
| 2,583,614 | 1/1952 | Taylor et al. | 260/465 D |
| 2,850,520 | 9/1958 | Merian et al. | 260/465 D |
| 2,936,319 | 5/1960 | Merian et al. | 260/465 D |
| 3,106,438 | 10/1963 | Converse et al. | 8/39 |
| 3,189,398 | 6/1965 | Pizzarello et al. | 8/39 |

OTHER PUBLICATIONS

Venkataraman, Chemistry of Synthetic Dyes, (Academic Press, New York, 1952) p. 1220. Vol. II.

Morrison et al., Organic Chemistry, (Allyn and Bacon, Boston, 1959) pp. 71–72.

*Primary Examiner*—Joseph Paul Brust
*Attorney, Agent, or Firm*—Joseph G. Kolodny; Edward McC. Roberts; Prabodh I. Almaula

[57] ABSTRACT

A water-insoluble styryl dyestuff of the formula

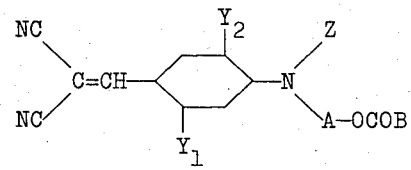

in which $Y_1$ represents hydrogen, methyl or methoxy, $Y_2$ hydrogen or methoxy, A lower alkylene which may contain a further group of the formula —OCOB, Z stands for a member selected from the group consisting of lower alkyl, phenyl-lower alkyl, lower alkanoyloxy-lower alkyl and the group of the formula —A—OCOB and B is a member selected from the group consisting of phenyl which may be substituted by chlorine, lower alkyl, lower alkoxy, lower carbalkoxy or hydroxy groups, thienyl, lower carbalkoxy-thieneyl, phenyl, styryl, phenoxymethyl and phenacetyl.

12 Claims, No Drawings

WATER-INSOLUBLE STYRYL DYESTUFFS

This application is a continuation-in-part of application Ser. No. 436,666, filed Mar. 2, 1965, now abandoned.

The present invention provides new water-insoluble styryl dyestuffs of the formula (1) 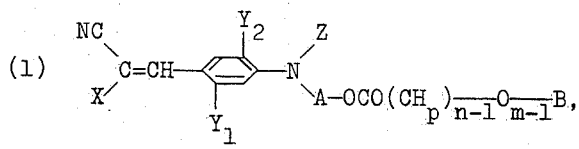

in which A represents an alkylene group preferably an ethylene group, which alkylene group may contain an —O— acyl group, B represents a benzene radical or a heterocyclic radical, for example, a furan, thiophene or pyridine radical, X represents a cyano or carbalkoxy group, $Y_1$ and $Y_2$ each represents a hydrogen atom, an alkyl or an alkoxy group, Z represents an alkyl or a phenylalkyl or an acyloxyalkyl group, preferably a radical of the formula

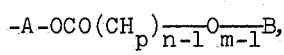

in which $m$ and $p$ represent 1 or 2, and $n = 1$ to 3, $p$ being 1 only when $n$ is 3.

In the scope of the present invention it is mainly dyestuffs of the formula (1a) 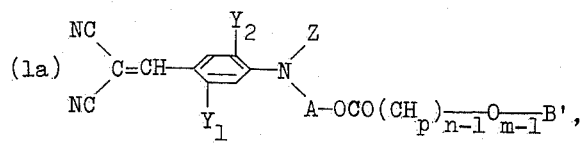

that are of interest, in which formula $Y_1$ represents a methyl group or a methoxy group, $Y_2$ represents a hydrogen atom or a methoxy group, B' represents a benzene or thiophene radical which may be substituted, A represents an alkylene group which may contain an -O-acyl group, and Z represents a lower alkyl group, a phenalkyl (preferably benzyl) group or an acyloxyalkyl (lower alkyl) group, especially a radical of the formula

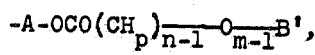

in which $m$ and $p$ are 1 or 2 and $n = 1$ to 3, $p$ being 1 only when $n$ is 3.

In this Specification the term "lower alkyl groups" refers to alkyl radicals containing 1 to 6 carbon atoms.

Dyestuffs of the invention that are of special interest are those of the formula (1b) 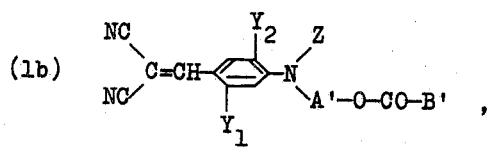

in which $Y_1$ represents a methyl group or a methoxy group, $Y_2$ represents a hydrogen atom or a methoxy group, Z represents the radical —A—O—CO—B', A' represents an alkylene group with 2 to 3 carbon atoms that may contain the grouping —O—CO—B' as -O-acyl radical and B' represents a benzene or thiophene radical that may be substituted.

The most representative of the compounds of the formula (1b) are styryl derivatives of the formula (1c) 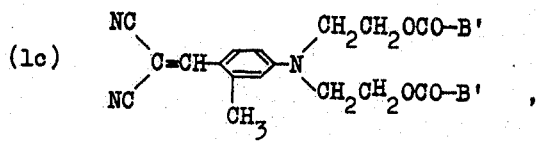

in which B' has the meaning given above.

A particular variant of the invention includes, for example, water-insoluble styryl dyestuffs of the formula (1d) 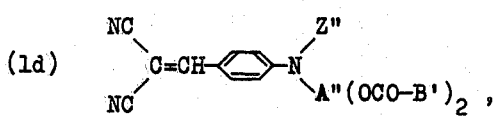

in which Z" represents an alkyl radical containing 1 to 6 carbon atoms, A" represents an alkylene radical containing 1 to 6 carbon atoms and B' represents a benzene or thiophene radical that may be substituted, and the dyestuffs of the formula (1e) 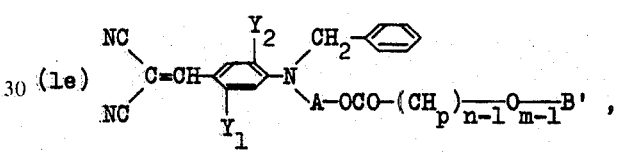

in which $Y_1$ represents a methyl group or a methoxy group, $Y_2$ represents a hydrogen atom or a methoxy group, B' represents a benzene or thiophene radical that may be substituted and A represents an alkylene group that may contain an —O—acyl group, constitute another variant.

The new dyestuffs may be obtained when a. an aldehyde free from groups imparting solubility in water and corresponding to the formula (2) 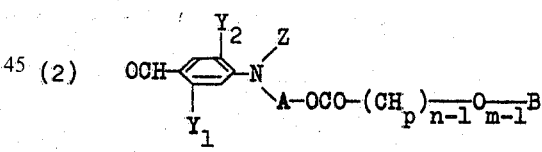

or an aldimine thereof is condensed with malodinitrile or a cyanoacetic acid alkyl ester, the symbols A, B, $Y_1$, $Y_2$, Z, $m$ and $n$ in the formula (2) having the meanings given above, or b. when 1 mol of a styryl derivative of the formula (3) 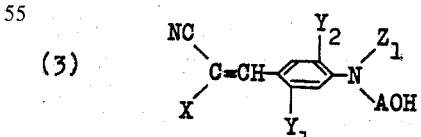

in which A, X and $Y_1$ have the meanings given above and $Z_1$ represents an alkyl or a hydroxyalkyl group, especially a hydroxyethyl group, is acylated with 1 mol of a halide or an anhydride of a carboxylic acid of the formula

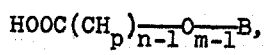

especially a benzene carboxylic acid, and with 1 mol of a halide or an anhydride of an aliphatic or a cycloaliphatic monocarboxylic acid or of a carboxylic acid of the formula

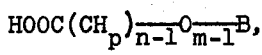

especially a benzene carboxylic acid. Molecule doubling can also be achieved when acylation is carried out with an appropriate dicarboxylic acid derivative instead of with a monocarboxylic acid derivative (as indicated above).

Starting materials specially suitable for method a of the process of the invention are aldehydes of the formula

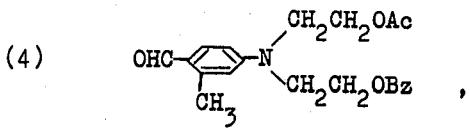

in which Ac represents the radical of a lower aliphatic monocarboxylic acid or a benzoyl radical and Bz represents a benzoyl radical. The benzoyl radicals may contain further substituents that do not impart solubility in water, for example, halogen atoms, alkyl, alkoxy or carbalkoxy groups. Among the aliphatic acyl radicals there may be mentioned, in particular, the radicals of acetic acid, propionic acid and butyric acid. The following aldehydes are examples:

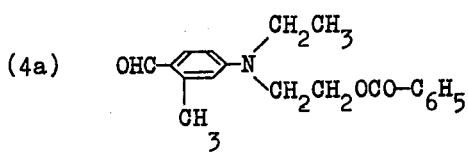

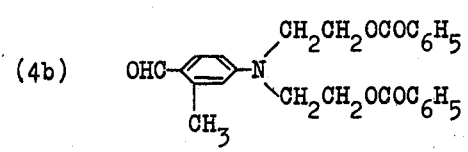

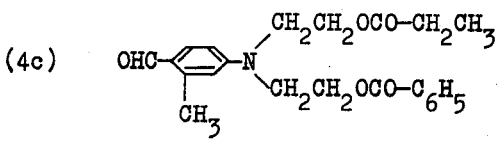

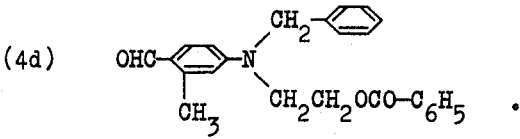

The above aldehydes may be obtained by known methods, for example, by acylation of the corresponding hydroxyaldehydes or by condensation of the corresponding acylated hydroxyethyl-*m*-toluidines with the products obtained hydroxyethyl-m-toluidines additively combining N-formyl compounds of secondary aromatic amines and phosphorus oxychloride and hydrolysis of the condensation product by the Vilsmeyer process or by condensation of the acylated hydroxyethyl-m1toluidines with dialkylformamides according to U.S. Pat. No. 2,995,565, granted Aug. 8, 1961 to Erwin JENNY, and hydrolysis of the condensation product obtained.

Condensation of the aldehydes with malodinitrile or a cyanoacetic acid alkyl ester is advantageously carried out with the application of heat in the presence of a basic catalyst, for example, ammonia, dimethylamine, diethylamine, piperidine, piperidine acetate, sodium alcoholate or potassium alcoholate, if necessary, in the presence of a solvent, for example, methanol, ethanol, benzene, toluene, xylene, chloroform or carbon tetrachloride. When using solvents the water formed during the reaction can be removed from the reaction mixture continuously by azeotropic distillation of the said solvents, which process steadily shifts the reaction equilibrium in favour of the condensation product. The condensation process may also be carried out in glacial acetic acid without the use of a basic catalyst or in some other organic acid, or in the absence of a solvent by fusing the reactants in the presence of a basic catalyst, for example, ammonium acetate or piperidine acetate.

Instead of the aldehydes it is also possible to use their aldimines as starting materials, that is to say, the products obtained by condensation with primary amines, especially aminobenzenes, in other words, the so-called Schiff bases of the formula

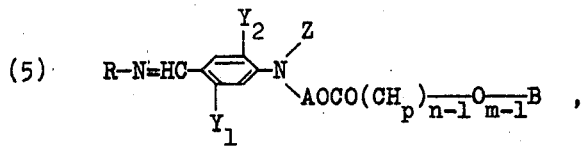

in which R is advantageously a benzene radical, for example a phenyl or sulfophenyl radical. Compounds of the formula (5) can be obtained by condensation of the product obtained when formaldehyde and hydrochloric acid are reacted with an amine of the formula

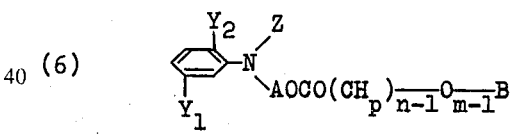

with nitrobenzene or a derivative thereof, for example, a nitrobenzene sulfonic acid, in the presence of iron and hydrochloric acid in accordance with Example 17 of U.S. Pat. No. 2,583,551, granted Jan. 29, 1952 to Joseph B. Dickey et al..

In method (b) of the process of the invention the starting materials advantageously used are compounds of the formula

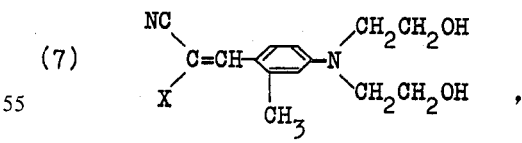

The acylation process is performed either with 2 mols of a halide or an anhydride of a benzoic acid, for example, benzoyl chloride, para-methoxybenzoyl chloride, para-methylbenzoyl chloride or para-carbomethoxybenzoyl chloride or the halide of an aryl fatty acid, for example, phenylacetic acid and dihydrocinnamic acid, or the halide of a phenoxyacetic acid or cinnamic acid or the halide of a heterocyclic monocarboxylic acid, for example, furan- or thiophene-2-carboxylic acid chloride, or pyridine-3-carboxylic acid chloride, or with 1 mol of a halide or an anhydride of an aromatic or heterocyclic monocarboxylic acid and 1 mol of a halide or an anhydride of an aliphatic, araliphatic or cycloaliphatic monocarboxylic acid, for example, acetyl chloride, acetic anhydride, propionic acid chloride or anhydride, chloracetyl chloride, phenoxyacetyl chloride, phenylacetyl chloride or hexahydrobenzoyl chloride or with chloroformic acid phenyl ester. It is also possible, by the use of mixtures of acid halides or acid anhydrides, to produce mixed acylated compounds. Acylation is advantageously carried out in an inert organic solvent, for example, pyridine, benzene, dioxane, isopropyl ether, ethyl acetate or dimethyl formamide. When preparing uniformly acylated compounds, it is also possible to use a large excess of the acylating agent instead of a solvent.

The new dyestuffs are eminently suitable for dyeing and printing fibrous polyester material, especially polyethylene terephthalate, particularly after they have been converted into a state of fine division e.g., by grinding, pasting or reprecipitation. They yield pure, strong, greenish yellow dyeings possessing an excellent fastness to light and to sublimation on such material when applied by the customary dyeing processes, for example, when applied from a dye liquor containing a fine dispersion of the dyestuff and advantageously a dispersing agent at a temperature close to 100°C, if desired or required, in the presence of a swelling agent (carrier process), or at a temperature above 100° (up to about 130°C) under super-atmospheric pressure (high-temperature process). The high degree of light fastness displayed by these dyestuffs is not impaired when they are used in the production of compound shades, for example, green compound shades.

Another attribute of the new dyestuffs is that they produce only a slight tint on wool or any other kind of fiber that may be present in the dyebath, and are thus very suitable for dyeing polyester-wool and polyester-cellulose triacetate blends.

The dyestuffs of the invention are also suitable for application by the so-called Thermosol process in which the fabric to be dyed is impregnated preferably at a temperature not exceeding 60°C with an aqueous dispersion of the dyestuff, advantageously containing 1 to 50 percent of urea and a thickening agent, especially sodium alginate, and then squeezed in the usual manner, so that the impregnated material advantageously retains 50 to 100 percent of its dry weight of dye liquor. In order to bring about fixation of the dyestuff, the impregnated material is heated to a temperature above 100°C, for example, between 180° to 210°C, for example, in a current of hot air, it being advantageous to dry the material prior to the heat treatment.

The above-mentioned Thermosol process is specially suitable for the dyeing of union fabrics made of polyester fibers and cellulosic fibers, especially cotton. When dyeing materials of this nature the padding liquor contains dyestuffs suitable for cotton, for example, vat dyestuffs, in addition to a dyestuff of the invention. When operating with vat dyestuffs the padded fabric has to be treated with an aqueous alkaline solution of one of the reducing agents normally used in vat dyeing after it has been subjected to the heat treatment.

The following Examples illustrate the invention. Unless otherwise stated, the parts and percentages are by weight.

Example 1

A solution of 24.18 parts of N:N-bis-(2-hydroxyethyl)-m-toluidine dibenzoate in 10 parts of dimethylformamide was added at 0° to 5°C to a mixture of 7 parts of dimethylformamide and 10.2 parts of phosphorus oxychloride and the whole heated for some time at 40° to 45°C. After the reaction the products were discharged on to a mixture of 80 parts of ice and 80 parts of water while stirring well, the pH value being adjusted to 6.5 by the addition of sodium hydroxide solution. After some time the oily aldehyde that precipitated was isolated and dried in vacuo.

8.6 Parts of 4-[N:N-bis-(2'-hydroxyethyl)-amino]-2-methylbenzaldehyde dibenzoate, 1.6 parts of malonic acid dinitrile and 0.2 part of piperidine were heated to the boil under reflux in 12 parts of methanol. The reaction mixture turned a deep yellow. As soon as the reaction had finished the reaction mixture was cooled to 0° to 5°C and the precipitated dyestuff of the formula

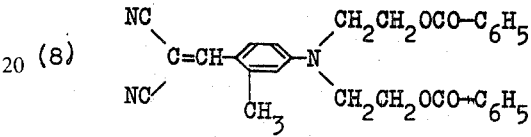

was isolated by filtration, washed with methanol and dried. It dissolved in organic solvents to form a yellow solution and dyed polyester fibers greenish yellow tints possessing excellent properties of fastness when applied in the form of an aqueous dispersion.

Example 2

8.6 Parts of 4-[N:N-bis-(2'-hydroxyethyl)-amino]-2-methylbenzaldehyde dibenzoate, 2.8 parts of cyanoacetic acid ethyl ester and 0.2 part of piperidine were heated to the boil under reflux in 12 parts of methyl alcohol. As soon as the reaction had finished the reaction mixture was cooled with ice to 0° to 5°C. The precipitated dyestuff was isolated by filtration, washed with methanol and dried. It dissolved in organic solvents to give a yellow solution and dyed polyester fibers greenish yellow tints possessing very good properties of fastness when applied in the form of a fine dispersion.

Example 3

2.71 Parts of 4-[N:N-bis-(2'-hydroxyethyl)-amino]-2-methylbenzylidene malononitrile were dissolved in 10 parts of pyridine and 4.22 parts of benzoyl chloride were added to the solution dropwise. The reaction mixture was heated at 80°C for about 30 minutes. When cold, the reaction mixture was discharged on to ice and water. The precipitated dyestuff was filtered and washed with dilute aqueous ammonia and water. It was identical with the dyestuff prepared in the manner described in Example 1.

Example 4

1 Part of the dyestuff of the formula

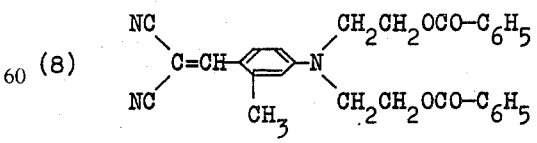

was ground in the wet state with 2 parts of a 50 percent aqueous solution of sulfite cellulose waste liquor and the mixture was dried.

The dyestuff preparation thus obtained was mixed with 40 parts of a 10 percent aqueous solution of a product obtained by condensing octadecyl alcohol with 20 mols of ethylene oxide and then 4 parts of a 40 percent acetic acid solution were added. A dyebath was prepared by bulking with water to 4,000 parts.

100 Parts of cleansed polyester fibrous material were entered into the dyebath thus prepared at 50°C, the temperature was raised to 120° to 130°C in the course of half an hour and dyeing continued for 1 hour at that temperature in a closed vessel. The material was then well rinsed. A greenish yellow dyeing possessing an excellent fastness to light and to sublimation was obtained.

Example 5

The following Table gives examples of dyestuffs of the formula (9) 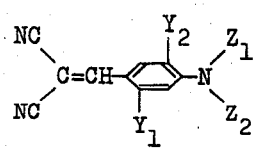

Dyestuffs numbered 1, 2, 3, 4, 5, 18, 19 and 20 were prepared from malonic acid dinitrile and the appropriate aldehyde by the method described in Example 1. The remaining dyestuffs in the Table were prepared by the method described in Example 3.

| No. | $Y_1$ | $Y_2$ | $Z_1$ | $Z_2$ | Tint |
|---|---|---|---|---|---|
| 1 | H | H | $CH_2CH_2OCO-C_6H_5$ | $CH_2CH_2OCO-C_6H_5$ | greenish yellow |
| 2 | $OCH_3$ | H | $CH_2CH_2OCO-C_6H_5$ | $CH_2CH_2OCO-C_6H_5$ | " |
| 3 | $CH_3$ | $OCH_3$ | $CH_2CH_2OCO-C_6H_5$ | $CH_2CH_2OCO-C_6H_5$ | " |
| 4 | $CH_3$ | H | $CH_2CH_2OCO-C_6H_5$ | $CH_2CH_2OCO-C_6H_4-Cl$ | " |
| 5 | $CH_3$ | H | $CH_2CH_2OCO-C_6H_4-Cl$ | $CH_2CH_2OCO-C_6H_4-Cl$ | " |
| 6 | $CH_3$ | H | $CH_2CH_2OCO-C_6H_4(Cl)$ | $CH_2CH_2OCO-C_6H_4(Cl)$ | " |
| 7 | $CH_3$ | H | $CH_2CH_2OCO-C_6H_4-CH_3$ | $CH_2CH_2OCO-C_6H_4-CH_3$ | " |
| 8 | $CH_3$ | H | $CH_2CH_2OCO-C_6H_4(CH_3)$ | $CH_2CH_2OCO-C_6H_4(CH_3)$ | " |
| 9 | $CH_3$ | H | $CH_2CH_2OCO-C_6H_4-C(CH_3)_3$ | $CH_2CH_2OCO-C_6H_4-C(CH_3)_3$ | " |
| 10 | $CH_3$ | H | $CH_2CH_2OCO-C_6H_4-OCH_3$ | $CH_2CH_2OCO-C_6H_4-OCH_3$ | " |

3,869,498

Continued

| No. | $Y_1$ | $Y_2$ | $Z_1$ | $Z_2$ | Tint |
|---|---|---|---|---|---|
| 11 | $CH_3$ | H | $CH_2CH_2OCO$-⟨⟩-⟨⟩ | $CH_2CH_2OCO$-⟨⟩-⟨⟩ | greenish yellow |
| 12 | $CH_3$ | H | $CH_2CH_2OCO$-⟨⟩-$COOCH_3$ | $CH_2CH_2OCO$-⟨⟩-$COOCH_3$ | " |
| 13 | $CH_3$ | H | $CH_2CH_2OCO$-⟨S⟩ | $CH_2CH_2OCO$-⟨S⟩ | " |
| 14 | $CH_3$ | H | $CH_2CH_2OCO$-⟨S⟩-$COOCH_3$ | $CH_2CH_2OCO$-⟨S⟩-$COOCH_3$ | " |
| 15 | $CH_3$ | H | $CH_2CH_2OCOCH_2$-⟨⟩ | $CH_2CH_2OCOCH_2$-⟨⟩ | " |
| 16 | $CH_3$ | H | $CH_2CH_2OCOCH_2O$-⟨⟩ | $CH_2CH_2OCOCH_2O$-⟨⟩ | " |
| 17 | $CH_3$ | H | $CH_2CH_2OCOCH=CH$-⟨⟩ | $CH_2CH_2OCOCH=CH$-⟨⟩ | " |
| 18 | $CH_3$ | H | $CH_2CH_2OCO$-⟨⟩ | $CH_2CH_2OCOCH_3$ | " |
| 19 | $CH_3$ | H | $CH_2CH_2OCO$-⟨⟩ | $CH_2$-⟨⟩ | " |
| 20 | $CH_3$ | H | $CH_2CH$-$CH_2OCO$-⟨⟩<br>\|<br>$OCO$-⟨⟩ | $CH_2CH_3$ | " |
| 21 | $CH_3$ | H | $CH_2CH_2OCOO$-⟨⟩ | $CH_2CH_2OCOO$-⟨⟩ | " |
| 22 | $CH_3$ | H | $CH_2CH_2OCO$-⟨⟩<br>HO  $CH_3$ | $CH_2CH_2OCO$-⟨⟩<br>HO  $CH_3$ | " |

Example 6

5.36 Parts of 4'-(di-β-benzoylhydroxyethylamino)-2'-methylbenzal-4-anisidine, 0.8 part of malonic acid dinitrile and 0.1 part of piperidine were heated at the boil under reflux for about 6 hours in 20 parts of absolute alcohol. As soon as the reaction had finished the reaction mixture was cooled and the precipitated dyestuff was isolated by filtration, washed with alcohol and dried. It was identical with the dyestuff prepared in the manner described in Example 1.

I claim:

1. A dyestuff of the formula

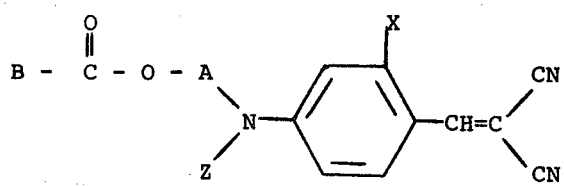

wherein X is methyl, methoxy or hydrogen; A is lower alkylene of 2 to 4 carbon atoms; Z is lower alkyl,

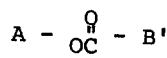

wherein A is as defined above, B' is benzyl, styryl, phenethyl, phenoxymethyl, phenyl, phenyl substituted by a member selected from the group consisting of chlorine, alkyl of 1 to 4 carbon atoms, lower alkoxy, hydroxy, carbo-lower-alkoxy; B is benzyl, phenethyl, styryl, phenoxymethyl, phenyl or phenyl substituted by a member selected from the group consisting of chlorine, alkyl of 1 to 4 carbon atoms, lower alkoxy, hydroxy, carbo-lower-alkoxy; and with the provision that when Z is lower alkyl, B is benzyl, phenethyl, phenoxymethyl or phenyl substituted by lower alkoxy and when Z is A — O — CO — B', B is a member selected from the group as defined above.

2. A water-insoluble styryl dyestuff according to claim 1, wherein B is a phenyl group.

3. A water-insoluble styryl dyestuff according to claim 1, wherein Z is a group of the formula A— O— CO— B'.

4. A water-insoluble dyestuff according to claim 1 wherein A is an ethylene group.

5. A water-insoluble dyestuff according to claim 1 of the formula

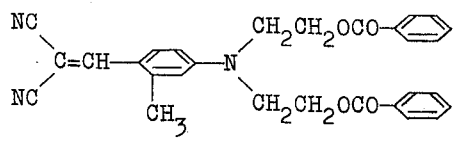

6. The styryl dyestuff according to claim 1 of the formula

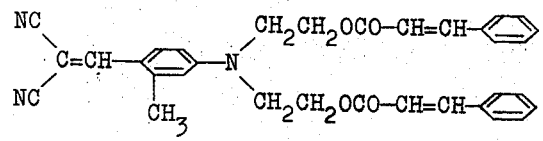

7. The styryl dyestuff according to claim 1 of the formula

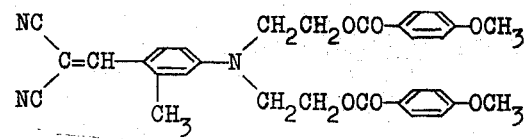

8. A water-insoluble styryl dyestuff according to claim 1, wherein Z is lower alkyl or

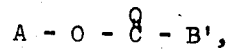

wherein A and B' are as defined in claim 1.

9. A water-insoluble styryl dyestuff according to claim 1, wherein B is phenyl, phenyl substituted by a member selected from the group consisting of chlorine, alkyl of 1 to 4 carbon atoms, methoxy, hydroxy, and carbo-lower-alkoxy.

10. A water-insoluble styryl dyestuff according to claim 1, wherein X is a methyl group.

11. The styryl dyestuff of the formula

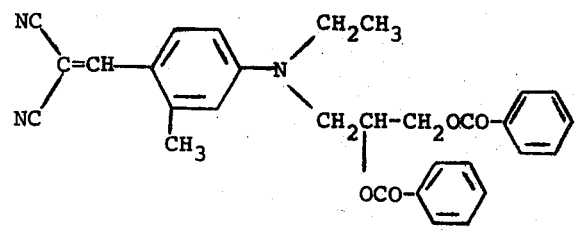

12. A dyestuff of the formula:

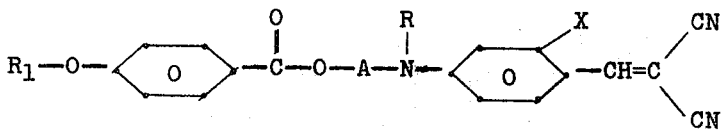

wherein X is hydrogen, methyl or methoxy; A is a lower alkylene of 2 to 4 carbon atoms; $R_1$ is a lower alkyl and R is a lower alkyl or

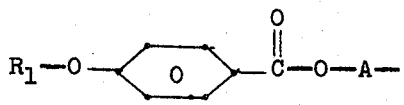

wherein $R_1$ and A are as defined above.

* * * * *